United States Patent
Ito et al.

(10) Patent No.: US 7,191,459 B2
(45) Date of Patent: Mar. 13, 2007

(54) ADAPTER FOR NON-CIRCULAR DISC

(75) Inventors: Tomoaki Ito, Osaka (JP); Masato Murata, Kyoto (JP); Masakazu Imafuku, Higashiosaka (JP)

(73) Assignee: Orient Instrument Computer Co., Ltd., Osaka (JP)

(*) Notice: Subject to any disclaimer, the term of this patent is extended or adjusted under 35 U.S.C. 154(b) by 283 days.

(21) Appl. No.: 10/503,608

(22) PCT Filed: Feb. 6, 2003

(86) PCT No.: PCT/JP03/01294

§ 371 (c)(1),
(2), (4) Date: Aug. 4, 2004

(87) PCT Pub. No.: WO03/067592

PCT Pub. Date: Aug. 14, 2003

(65) Prior Publication Data

US 2005/0125818 A1    Jun. 9, 2005

(30) Foreign Application Priority Data

Feb. 8, 2002  (JP)  .............................. 2002-033020

(51) Int. Cl.
G11B 23/00  (2006.01)
(52) U.S. Cl. .................................. 720/720; 369/289.1
(58) Field of Classification Search ............... 720/720, 720/745; 369/289.1
See application file for complete search history.

(56) References Cited

U.S. PATENT DOCUMENTS

2003/0035364 A1* 2/2003 Choi .......................... 369/289

FOREIGN PATENT DOCUMENTS

| DE | 20001884 U1 | * | 5/2000 |
| DE | 20013902 U1 | * | 12/2000 |
| DE | 200 21 679 | | 3/2001 |
| DE | 20021679 U1 | * | 3/2001 |
| EP | 0 283 221 | | 9/1988 |
| JP | 07006542 A | * | 1/1995 |
| JP | 2001256745 A | * | 9/2001 |
| JP | 2002093096 A | * | 3/2002 |
| JP | 2002343050 A | * | 11/2002 |

* cited by examiner

Primary Examiner—William J Klimowicz
(74) Attorney, Agent, or Firm—Wood, Phillips, Katz, Clark & Mortimer

(57) ABSTRACT

An adapter A1 made of a synthetic resin includes an annular frame 1 having an outside diameter of 12 cm, a disk receiving section 2 provided continuously on a lower portion of an inner edge of the frame 1, and a pair of disk pressing sections 3 and 3 provided continuously on an upper portion of the inner edge of the frame 1. The disk receiving section 2 is provided with a circular opening 4 for causing an information recording area of a disk to face an optical reader of a disk player. A disk press-contact projection 7 formed so that a projection height is gradually increased in a disk rotation direction Y is provided on a lower surface of each disk pressing section 3. This adapter A1 can securely install a non-circular optical disk even if the optical disk has a slightly different size, and an installation operation of the non-circular optical disk can be easily performed.

18 Claims, 15 Drawing Sheets

ADAPTER FOR NON-CIRCULAR DISC

TECHNICAL FIELD

The present invention relates to a non-circular optical disk adapter used for adapting a non-circular optical disk like an optical disk, such as a card type CD, a business-card type CD or a DVD, to a disk loader of a disk player included in a computer or the like.

The "disk players" herein include devices which read information recorded on an optical disk, devices which write information to a CD-R, a DVD-R, a DVD-RW, a DVD-RAM, a DVD+R, DVD+RW and the like, and a copying apparatus.

BACKGROUND ART

It is known in the art that the standard size of a compact disk (hereinafter, "CD") on which information is recorded is that of a circle having a diameter of 12 cm or 8 cm. Recently, besides the CD of standard size, a rectangular CD which has a length of about 85 to 89 mm and a width of about 55 to 60 mm, and which includes a central hole and an annular information recording area provided outward of a clamping area has appeared. The CD of this type is referred to as "a business-card type CD" or "a card type CD" from its size.

The business-card type CD of no regular size is difficult to be installed on an existing disk player without any modification. This is due to the difficulty in positioning or centering business-card type CDs properly for recording and reproducing within the disk player. Therefore, a business-card type CD which has a positioning projection provided on a lower surface of the disk, fitted into an 8 cm CD mounting concave portion of a transport tray of a disk player, and used to perform the positioning or centering has been proposed (see WO99/0765 and the like).

Nevertheless, even the business-card type CD including such a positioning means cannot be installed in the existing disk player without a transport tray, particularly a slot-in or vertical disk player.

Japanese Patent Application Laid-Open No. 2000-11573 discloses a business-card type CD adapter capable of installing a business-card type CD in such a slot-in or vertical disk player.

Meanwhile, while the standard size of the circular CD is set to have a diameter of 12 cm or 8 cm, no standard size is set at present for the CD referred to as the business-card type CD. Therefore, as already stated, business-card type CDs of various sizes are commercially available.

The business-card type CD adapter disclosed in the Japanese Patent Application Laid-Open No. 2000-11573 can be used for the business-card type CD of a specific size, and cannot be used for the business-card type CD of a size different from the specific size. This business-card type CD is made of elastic material. For this reason, if the difference in length, width, and thickness between the business-card type CD of a specific size and that of different size is about 0.3 mm, the latter CD can be forcedly installed in the adapter. However, this CD is likely to be detached from the adapter within the disk player while it is subjected to a vertical or a rotational movement within the disk player.

The present invention has tackled the problems pointed out above. Therefore, it is an object of the present invention to provide a non-circular optical disk adapter capable of installing disks of different size and facilitating the disk installation operation.

Other objects of the present invention will be readily apparent from the embodiments to be described later.

SUMMARY OF THE INVENTION

In one embodiment according to the present invention a non-circular optical disk adapter is made of an elastic material, and includes a disk receiving section provided continuously on a lower portion of an inner edge of an annular frame having an outside diameter of 12 cm; and at least a pair of disk pressing sections provided continuously on an upper portion of the inner edge of the annular frame, for sandwiching a non-circular optical disk between the disk pressing sections and the disk receiving section, and is characterized in that the disk receiving section includes a circular opening for causing an information recording area of the disk to face an optical reader or an optical writer included in a disk player, and in that a disk press-contact projection or protrusion formed so that a projection height is gradually increased in a disk rotation direction is provided on a lower surface of each of the disk pressing sections or on an upper surface of a region of the disk receiving section opposed to each of the disk pressing sections.

In this adapter, the non-circular optical disk mounted on the disk receiving section is rotated so that its corners are slipped into below the respective disk press-contact projections, thereby positioning the corners below the respective disk press-contact projections. Following the rotational operation of this disk, at least one of the disk pressing sections and the disk receiving section is gradually forced outside by the corners of the disk, and elastically deformed, and an elastic restoring force is accumulated therein. This accumulated restoring force enables the corners of the disk to be securely sandwiched between the disk press-contact projections and the disk receiving section or between the disk press-contact projections and the disk pressing sections, respectively, thereby maintaining a disk installation state.

Furthermore, each disk press-contact projections is formed so that the projection height is gradually increased in the disk rotation direction, even the disk having a peripheral edge of a different thickness or the disk having a different length or width can be securely sandwiched. Furthermore, it is possible to prevent a defect that the state of sandwiching the disk is released during rotation of the disk.

Examples of the non-circular optical disk installed in this adapter include a business-card type optical disk, a barrel optical disk, and a square optical disk.

In the adapter, it is preferable that the disk press-contact projection is formed so that the projection height is gradually increased in the disk rotation direction and in a radial direction of the annular frame.

In this case, even the disk having the peripheral edge of the different thickness or the disk having the different length or width can be furthermore securely sandwiched.

In the adapter, it is preferable that the disk press-contact projection includes a first disk press-contact projection formed so that the projection height is gradually increased in the disk rotation direction, and a second disk press-contact projection adjacent to a maximum protruding part of the first disk press-contact projection, and that a projection height of an entire protruding surface of the second disk press-contact projection is set to be equal to or larger than a maximum projection height of the first disk press-contact projection.

In this case, the projection height of the entire protruding surface of the second disk press-contact projection is set to be equal to or larger than the maximum projection height of the first disk press-contact projection. Therefore, even the disk having a thin peripheral edge can be securely sandwiched.

In the adapter, it is preferable that a disk abutment section which prevents the disk sandwiched between the disk pressing sections and the disk receiving section from being moved in the disk rotation direction during rotation of the disk is provided.

In this case, a stable disk installation state is obtained. In addition, in this adapter, the disk is abutted on the abutment sections during the disk installation operation, whereby the installation operation is completed. Due to this, it is possible to recognize that installation is completed by means other than visual recognition.

In the adapter, it is preferable that the opening is formed into a circle having a diameter of 8 cm, and provided concentrically with the annular frame.

According to this adapter, if the disk includes the positioning projections, the disk is installed in the adapter while the disk positioning projections are fitted into the opening. This can ensure positioning the disk.

In the adapter, it is preferable that circular-arc elongated holes are provided in regions of the disk receiving section opposed to the respective disk pressing sections, one or a plurality of disk pressing projections protruding to a center of the opening are provided at positions corresponding to the respective elongated holes on an inner edge of the disk receiving section, and that the one or plurality of disk pressing projections provided between positioning projections of the installed disk and the disk receiving section press the disk toward the center of the opening by an elastic restoring force of thin circular-arc sections between the pressing projections and the elongated holes.

In this case, the disk is pressed toward the center of the opening by the elastic restoring force of the thin circular-arc sections between the pressing projections and the elongated holes, thereby securely maintaining the disk installation state.

In the adapter, it is preferable that the one or plurality of disk pressing projections are formed so that projection amounts are gradually increased in the disk rotation direction.

In this case, the disk is smoothly rotated during the disk installation operation, so that the disk installation operation can be easily performed.

In the adapter, it is preferable that the disk receiving section is separated from the inner edge of the annular frame right under the disk pressing sections.

In this case, an adapter formation processing can be easily performed.

In the adapter it is preferable that, in a state in which the non-circular optical disk is installed, a total weight is set to fall within a range from a weight of the circular optical disk having a diameter of 8 cm to a weight of the circular optical disk having a diameter of 12 cm.

The reason is as follows: If the total weight is less than that of the circular optical disk having a diameter of 8 cm or exceeds the weight of the circular optical disk having a diameter of 12 cm, a normal rotational operation cannot be attained, and for example, an unstable disk rotational operation results. If this occurs, it will be difficult to read information recorded on the optical disk and write information on the optical disk. It is, therefore, preferable that the total weight is set to fall within the range from the weight of the circular optical disk having the diameter of 8 cm to the weight of the circular optical disk having the diameter of 12 cm. The total weight is particularly preferably set within the range of 3 to 22 g, more preferably set within the range of 5 to 18 g, most preferably set within the range of 7 to 16 g.

DESCRIPTION OF THE PREFFERED EMBODIMENTS

Figure 1:
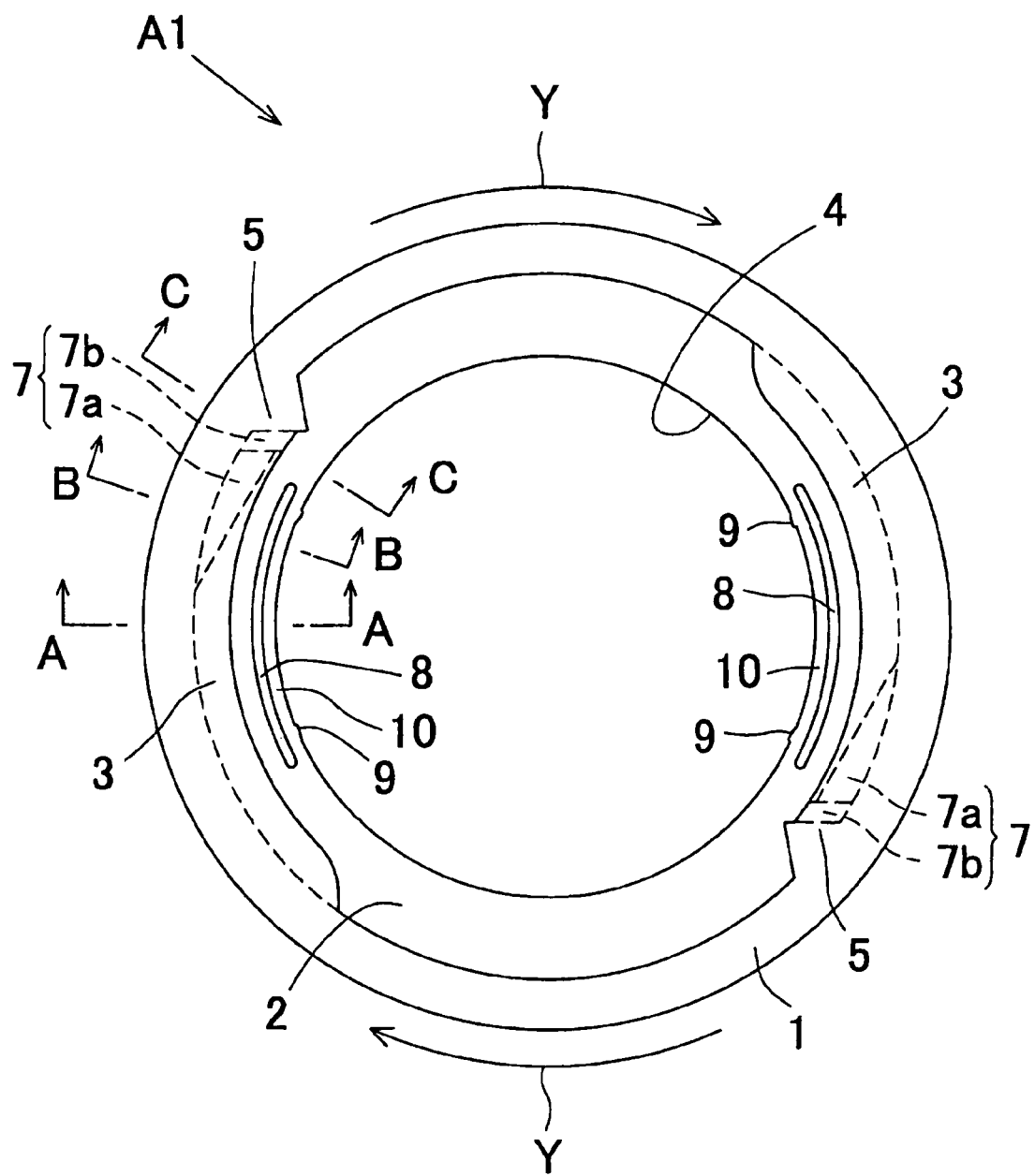
FIG. 1 is a plan view of a non-circular optical disk adapter according to a first embodiment of the present invention.
Figure 2:
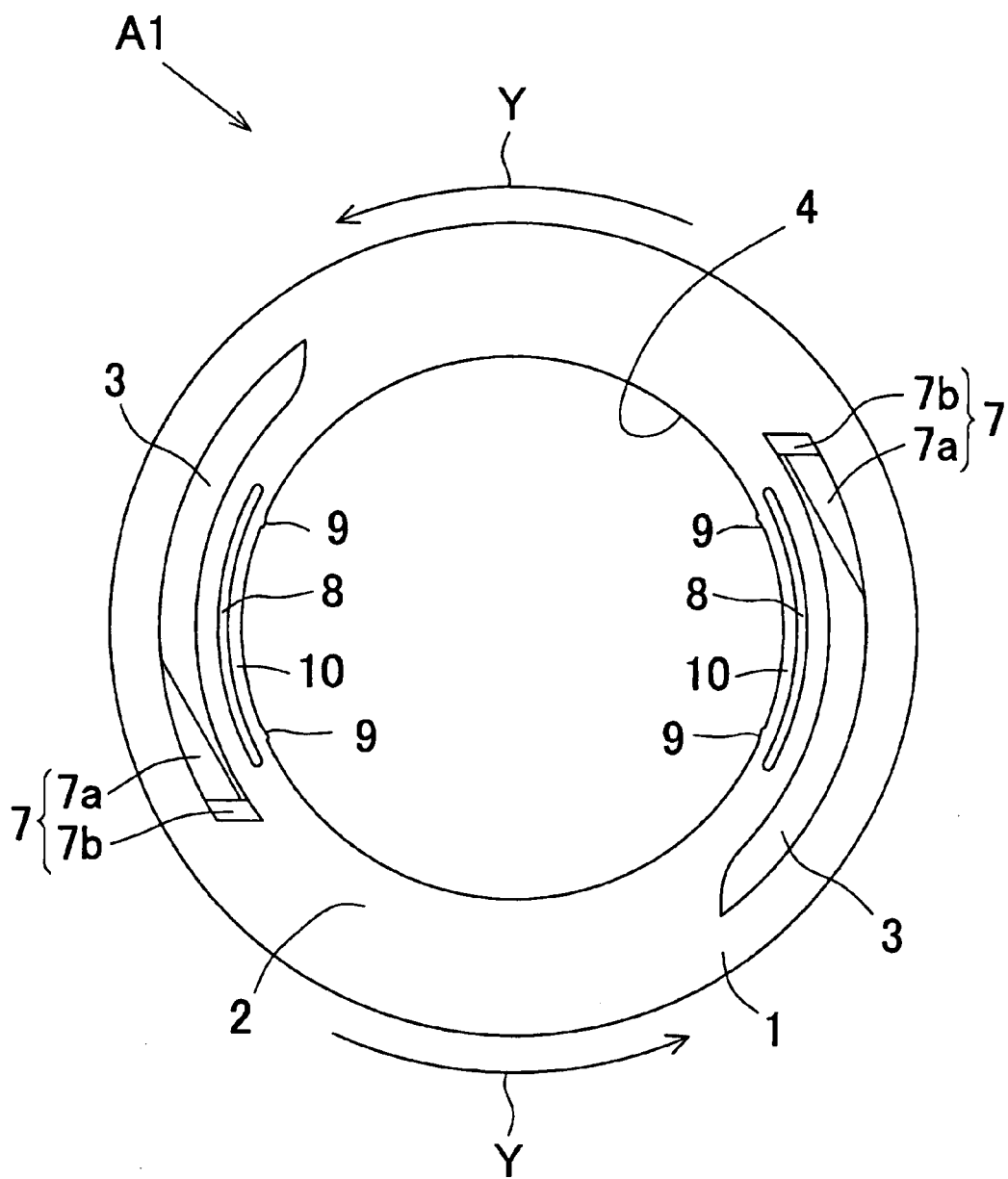
FIG. 2 is a bottom view of the adapter.
Figure 15:
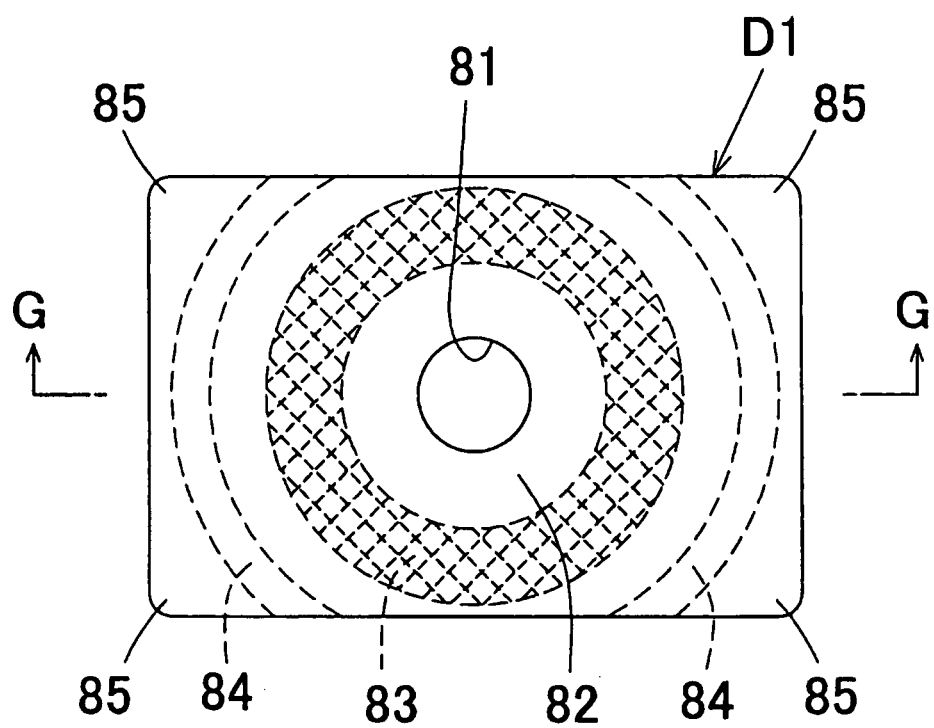
FIG. 15 is a plan view of the business-card type CD.
Figure 16:
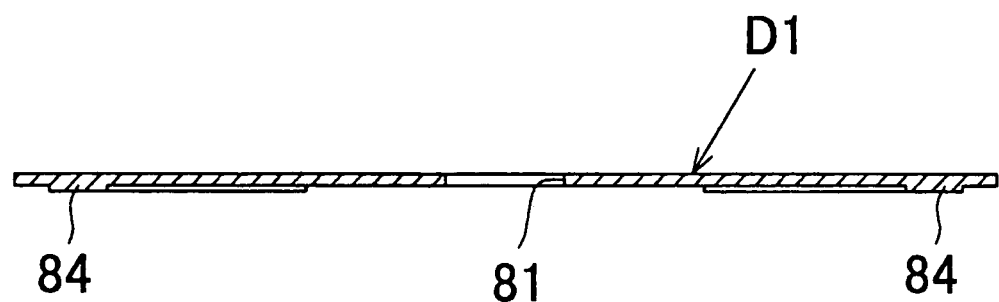
FIG. 16 is a cross-sectional view taken along a line G—G of FIG. 15.

The present invention will be more particularly described by way of example illustrated in the drawings:

Referring to FIGS. 1 and 2, reference symbol (A1) denotes a non-circular optical disk adapter according to a first embodiment of the present invention. This adapter (A1) is preferably made of an elastic synthetic resin such as ABS or polycarbonate. A business-card type CD (D1) shown in FIGS. 15 and 16 is installed, as a non-circular optical disk, in this adapter (A1). A total weight of the adapter (that is, a sum of a weight of the business-card type CD (D1) and a weight of the adapter (A1)) while this business-card type CD (D1) is installed in the adapter (A1) is set to fall within a range from a weight of a circular optical disk having a diameter of 8 cm to a weight of a circular optical disk having a diameter of 12 cm both of which optical disks are commercially available. In FIG. 1, an arrow (Y) indicates a rotation direction of the business-card type CD (D1) rotated by a spindle (not shown) included in a disk player.

As shown in FIGS. 15 and 16, this business-card type CD (D1) is a rectangle having a length of about 85 to 89 mm and a width of 55 to 60 mm, and is used for reproduction only. This business-card type CD (D1) includes a central hole (81) and an annular information recording area (83) provided outward of a clamping area (82). A positioning projection (84) extending in a circular arc fashion is formed unitarily on a lower surface (that is, an information read surface) of this business-card type CD (D1). This business-card type CD (D1) is set to have a thickness of a peripheral edge of 0.9 mm, a projection height of the positioning projection (84) of 0.5 mm, and a total thickness of 1.4 mm.

As shown in FIGS. 1 and 2, the adapter (A1) according to the first embodiment includes an annular frame (1), a disk receiving section (2) which receives the business-card type CD (D1), and a pair of disk pressing sections (3) and (3) for sandwiching the business-card type CD (D1) received by the disk receiving section (2) between the disk pressing sections (3) and the disk receiving section (2).

The annular frame (1) has an outside diameter of 12 cm which is equal to the diameter of the circular CD of the standard size. A thickness of this annular frame (1) is set to be substantially equal to that of the circular CD of the standard size.

The paired disk pressing sections (3) and (3) are provided continuously and integrally with each other above positions opposed each other on an inner edge of the annular frame (1) in an inward protruding manner. Each disk pressing section (3) is formed to have a size by which the disk pressing section (3) can press two adjacent corners among four corners of the CD (D1) when the CD (D1) is installed.

Figure 3:
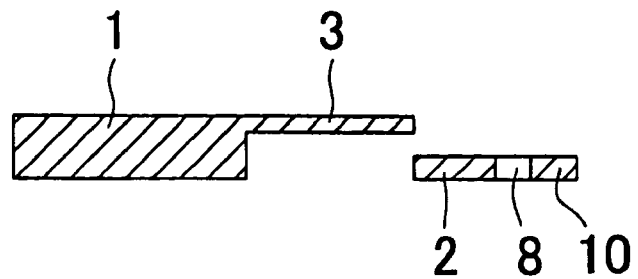
FIG. 3 is a cross-sectional view taken along a line A—A of FIG. 1.
Figure 4:
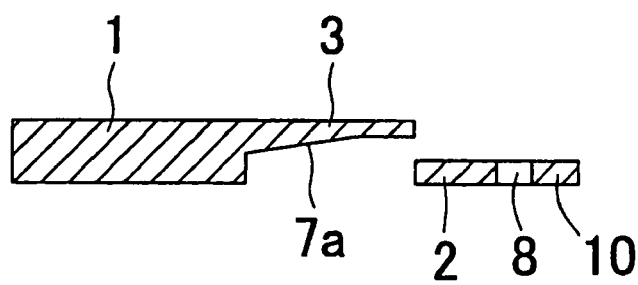
FIG. 4 is a cross-sectional view taken along a line B—B of FIG. 1.
Figure 5:
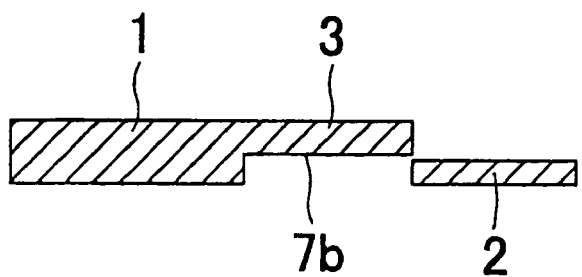
FIG. 5 is a cross-sectional view taken along a line C—C of FIG. 1.

The disk receiving section (2) is provided continuously and integrally on a lower portion of the inner edge of the annular frame (1) in an inward protruding manner. A circular opening (4) having a diameter of 8 cm and causing the information recording area (83) of the business-card type CD (D1) to face an optical reader (not shown) included in a disk player is provided in the central region of the disk receiving section (2), concentrically with the annular frame (1). As shown in FIGS. 3 to 5, this disk receiving section (2) is separated from the inner edge of the annular frame (1) right under the disk pressing sections (3). This is due to convenience of manufacturing of the adapter (A1).

Furthermore, as shown in FIG. 1, a circular-arc elongated hole (8) is provided in a region of this disk receiving section (2) which faces each disk pressing section (3). In addition, two disk pressing projections (9) protruding toward the center of the opening (4) are provided integrally at positions corresponding to the respective elongated holes (8) on an inner edge of the disk receiving section (2). A thin circular-arc portion (10) is formed between each disk pressing projection (9) and each elongated hole (8).

In FIG. 3, a distance between an upper surface of the disk receiving section (2) and a lower surface of the disk pressing section (2) is set to be substantially equal to a thickness of a peripheral edge of the business-card type CD (D1).

Figure 6:
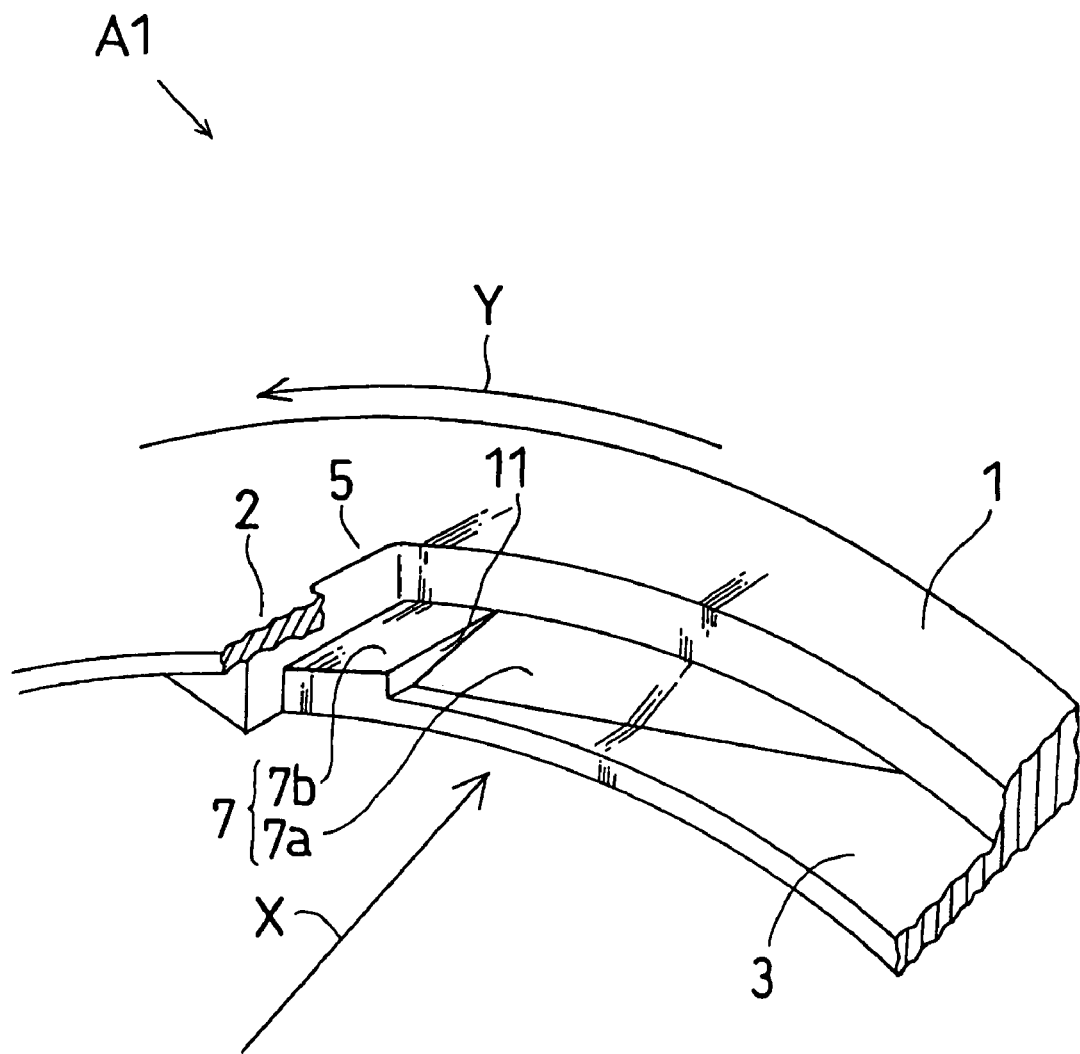
FIG. 6 is an important part enlarged perspective view which depicts a disk press-contact projection while the adapter is placed upside down.

As shown in FIG. 6, a disk press-contact projection (7) composed of a first disk press-contact projection (7a) formed so that a projection height is gradually increased in a rotation direction (Y) of the business-card type CD and a radial direction (X) of the annular frame (1), and a second disk press-contact projection (7b) formed to be adjacent to a maximum protruding side of the first disk press-contact projection (7a) is provided on the lower surface of each disk pressing section (3). In this disk press-contact projection (7), a projection height of an entire projection surface of the second disk press-contact projection (7b) is set equal to the projection height of the maximum protruding part of the first disk press-contact projection (7a). Although not shown in the drawings, the projection height of the entire protruding surface of the second disk press-contact projection (7b) may be set larger than the projection height of the maximum protruding part of the first disk press-contact projection (7a).

As shown in FIG. 6, a disk abutment section (5) is provided on a distal end side of the disk pressing section (3) in the rotation direction (Y) of the business-card type CD so as to prevent the business-card type CD (D1) sandwiched between the disk pressing sections (3) and the disk receiving section (2) from being moved in the rotation direction (Y) during rotation of the business-card type CD by the spindle of the disk player. This disk abutment section (5) is formed to protrude inward from the inner edge of the annular frame (1), to have a lower end provided to be continuous to the disk receiving section (2), and to have an upper surface flush with the upper surface of the disk pressing section (3).

Figure 7:
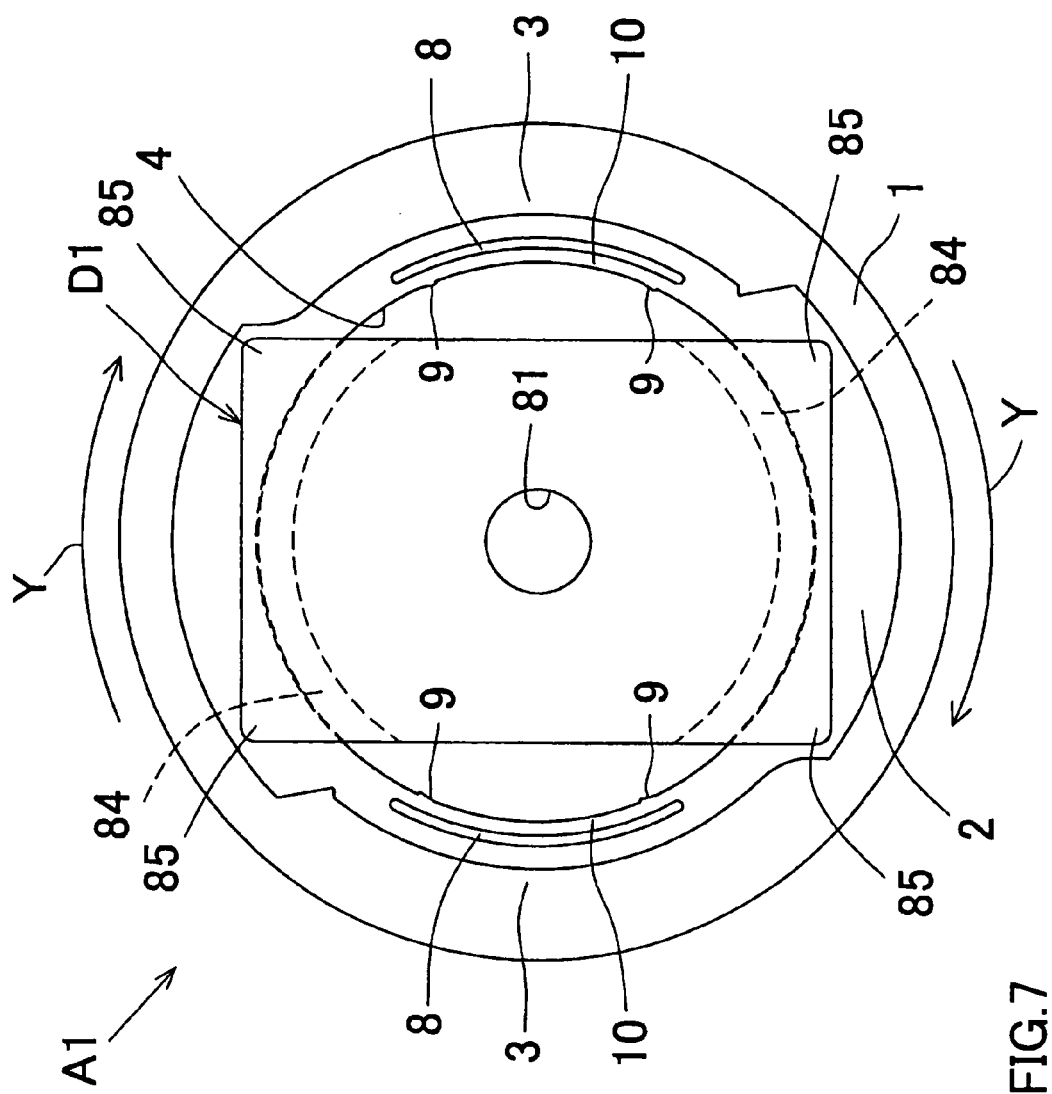
FIG. 7 is a plan view which depicts a state in which a business-card type CD is mounted on a disk receiving section of the adapter.
Figure 8:
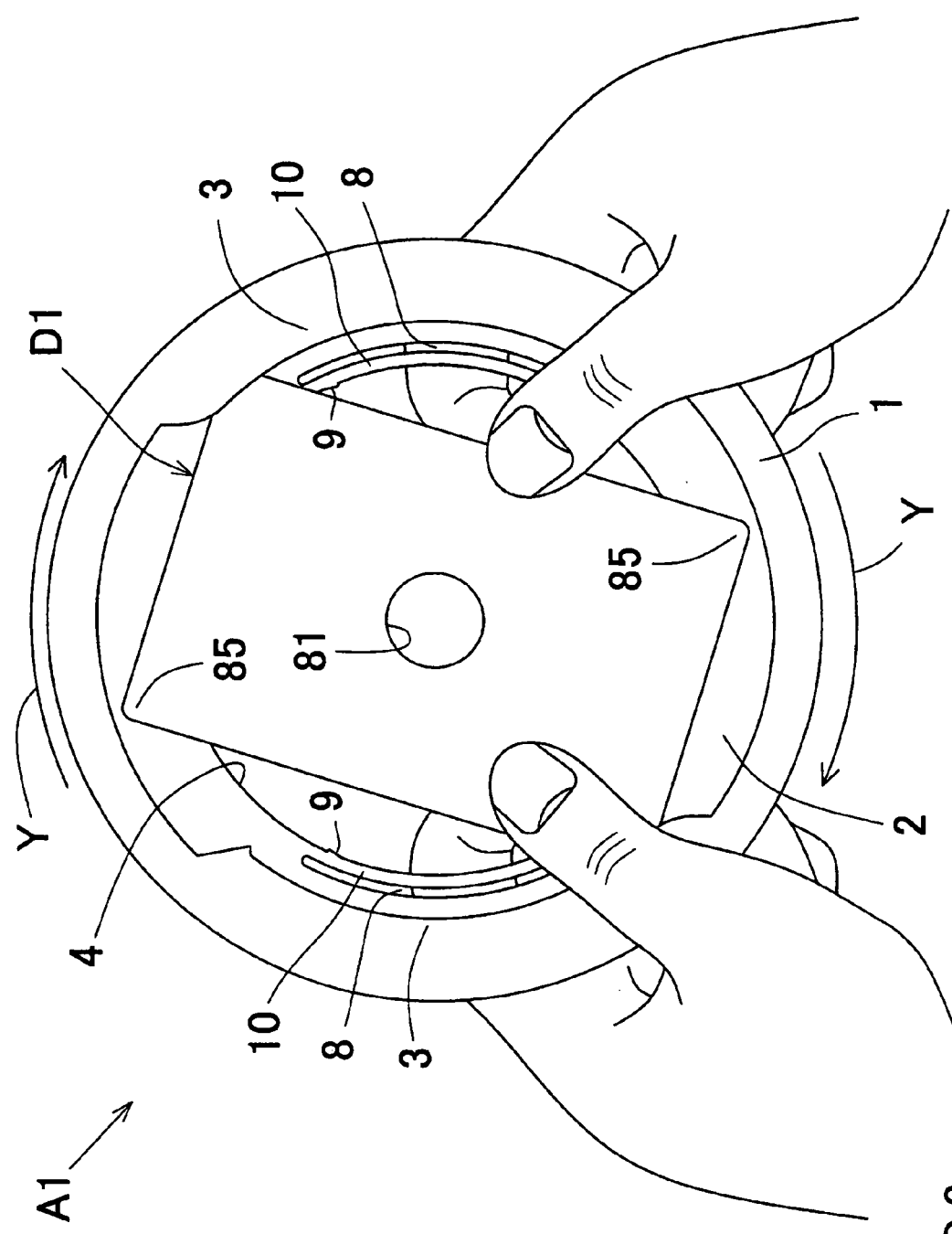
FIG. 8 is a plan view which depicts a state in which the business-card type CD is being installed in the adapter.
Figure 9:
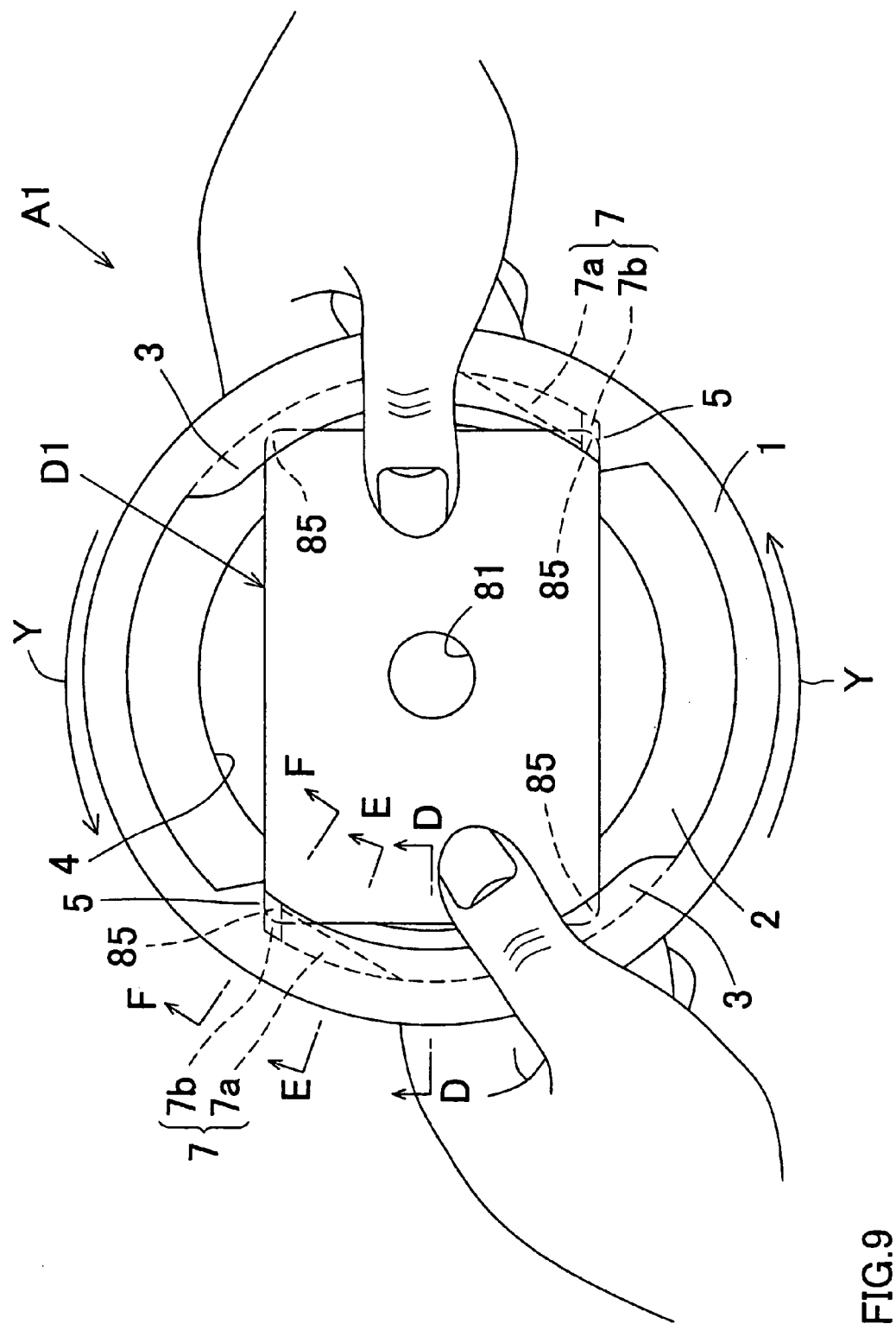
FIG. 9 is a plan view which depicts a state in which the business-card type CD is installed in the adapter.
Figure 10:
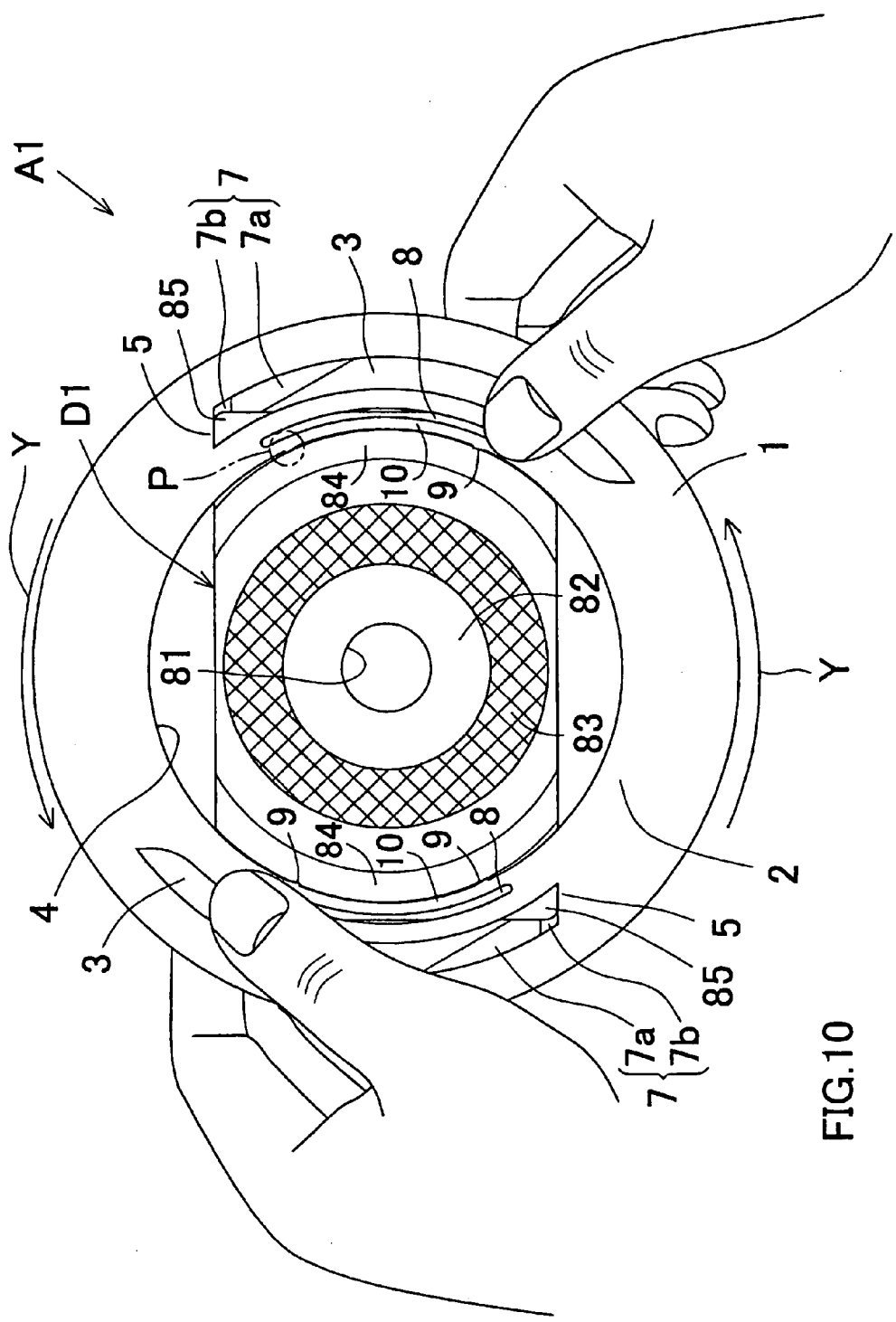
FIG. 10 is a bottom view which depicts a state in which the business-card type CD is installed in the adapter.
Figure 11:
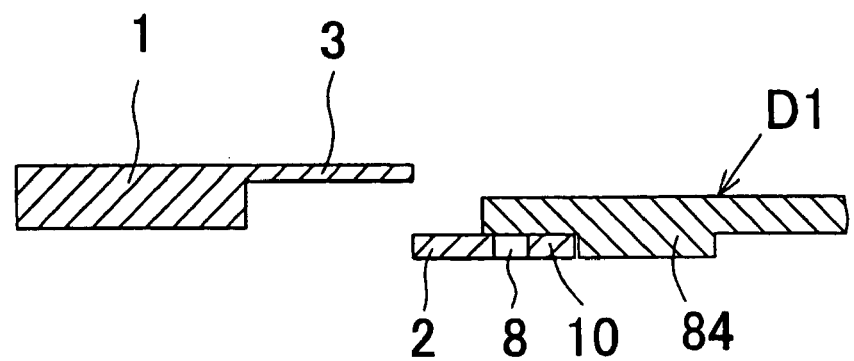
FIG. 11 is a cross-sectional view taken along a line D—D of FIG. 9.
Figure 12:
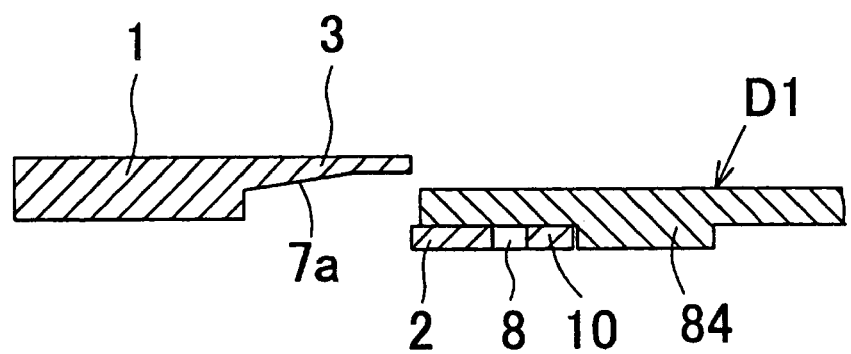
FIG. 12 is a cross-sectional view taken along a line E—E of FIG. 9.
Figure 13:
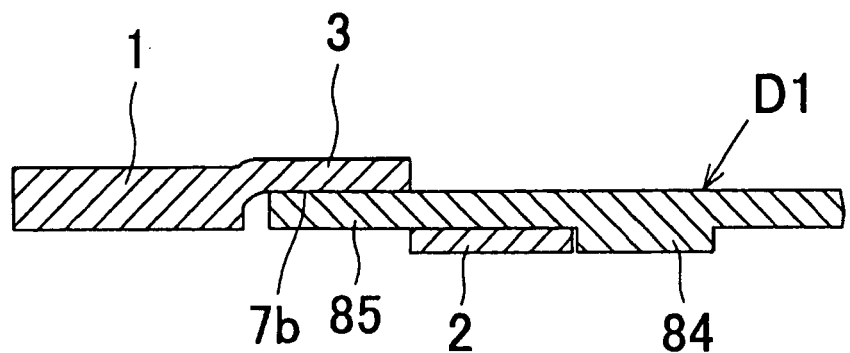
FIG. 13 is a cross-sectional view taken along a line F—F of FIG. 9.

Subsequently, a process for installing the business-card type CD (D1) in the adapter (A1) will be described:

First, as shown in FIG. 7, the business-card type CD (D1) is mounted on the disk receiving section (2) so as to fit the positioning projection (84) provided on the lower surface of the CD (D1) into the opening (4). In this state, while the business-card type CD (D1) is rotated relatively to the adapter (A1) in the rotation direction (Y) of the business-card type CD by the spindle of the disk player, a pair of diagonal corners (85) of the business-card type CD (D1) are slipped into below the respective disk pressing sections (3) as shown in FIG. 8. When the card type CD (D1) is furthermore rotated in the same direction, the corners (85) of the business-card type CD (D1) are located below the respective second disk press-contact projections (7b) as shown in FIG. 9. Following the rotational operation of the corners (85), the disk pressing sections (3) and the disk receiving section (2) are protruded outside and elastically deformed as shown in FIG. 13, whereby an elastic restoring force is accumulated in the disk pressing sections (3) and the disk receiving section (2). This elastic restoring force enables the corners (85) of the business-card type CD (D1) to be fixedly sandwiched between the second disk press-contact projections (7b) and the disk receiving section (2), respectively, thereby maintaining an installation state of the business-card type CD (D1). In this state in which the corners (85) of the business-card type CD (D1) are sandwiched, the corners (85) are abutted on the disk abutment portions (5), respectively as shown in FIG. 10. Due to this, the corners (85) cannot be rotated any more, so that the installation operation of the business-card type CD is completed.

Figure 14:
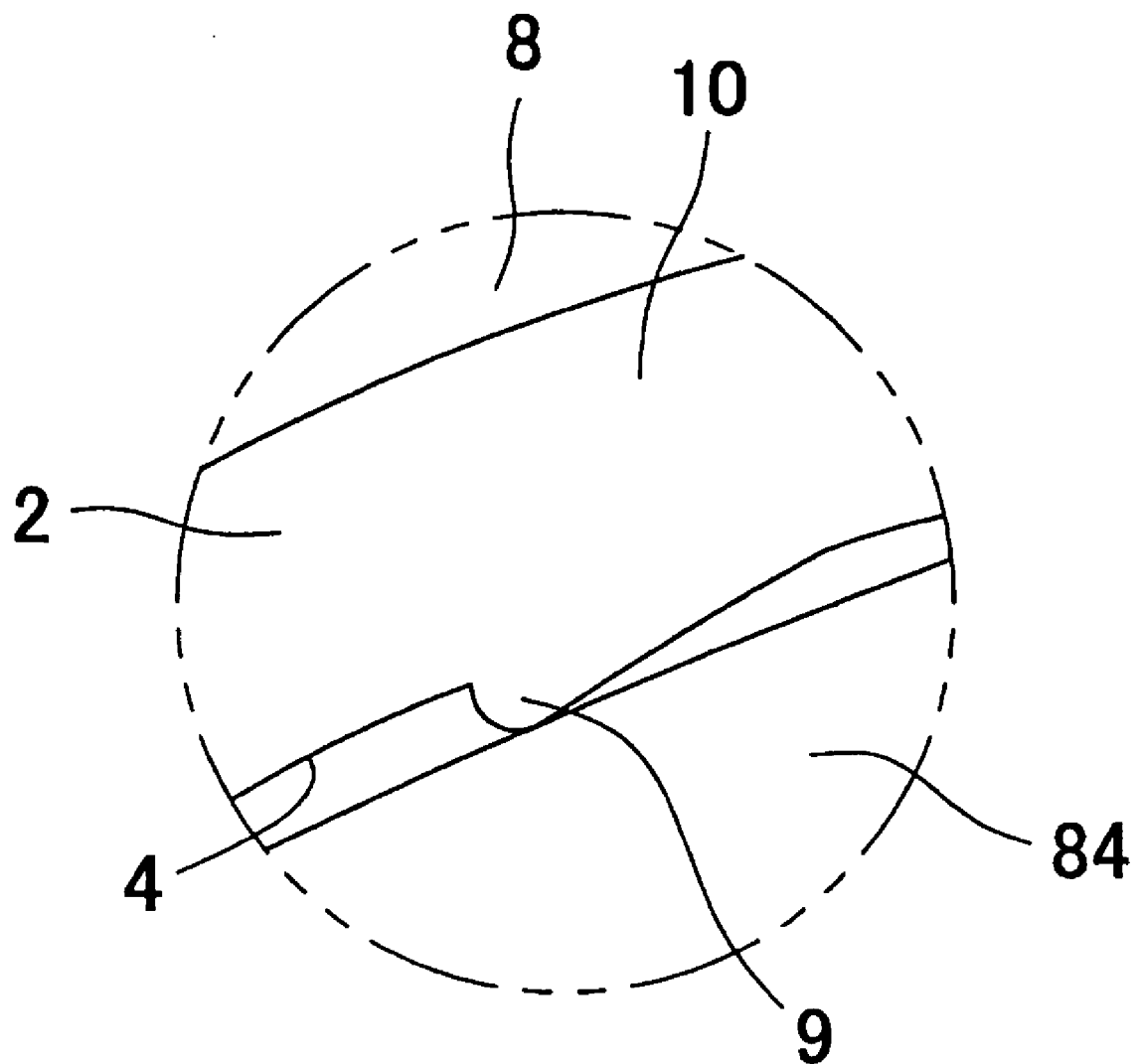
FIG. 14 is an enlarged view of a part P shown in FIG. 10.

In this installation state of the business-card type CD, the disk pressing projections (9) are arranged between the positioning projections (84) of the business-card type CD (D1) and the disk receiving section (2) as shown in FIGS. 10 and 14. Thin circular-arc sections (10) formed between the disk pressing projections (9) and the elongated holes (8) of the disk receiving section (2) are slightly forced out toward the elongated hole (8) by the disk pressing projections (9), and are elastically deformed. An elastic restoring force is thereby accumulated in the respective thin circular-arc portions (10). The elastic restoring force accumulated in the thin circular-arc sections (10) enable the disk pressing projections (9) to press the business-card type CD (D1) toward the center of the opening (4), thereby strongly maintaining the installation state of the business-card type CD.

In this adapter (A1), as shown in FIGS. 10 and 14, the disk pressing projections (9) are formed so that a projection amount is gradually increased in the rotation direction (Y) of the business-card type CD (D1). Therefore, when the business-card type CD (D1) is installed, the business-card type CD (D1) can be smoothly rotated, thereby facilitating the installation operation of the business-card type CD. If the disk pressing projections (9) are detached from the portions between the positioning projections (84) of the business-card type CD (D1) and the disk receiving section (2) and deviated below the positioning projections (84) during the installation operation of the business-card type CD, lower surfaces of the thin circular-arc sections (10) near the disk pressing projections (9) are pushed by fingers as shown in FIG. 10. By doing so, the disk pressing projections (9) are forced into the portions between the positioning projections (84) of the business-card type CD (D1) and the disk receiving section (2), and arranged between the positioning projections (84) and the disk receiving section (2).

The adapter (A1) in which the business-card type CD (D1) is thus installed is installed in the disk player, and the business-card type CD (D1) is rotated at a high velocity in the rotation direction of the arrow (Y) together with the adapter (A1) by the spindle included in the disk player. At this time, even if the corners (85) of the business-card type CD (D1) are not located below the second disk press-contact projections (7b) and a force of sandwiching the corners (85) is weak, the corners (85) can be strongly sandwiched. This is because the corners (85) of the business-card type CD are moved in a direction in which the force of sandwiching the corners (85) strongly acts on the corners (85) by the rotational operation of the business-card type CD (D1). Therefore, a defect that the business-card type CD (D1) is detached from the adapter (A1) does not occur.

When the business-card type CD (D1) is detached from the adapter (A1), the above installation procedures for the business-card type CD (D1) may be performed in reverse order. Namely, the business-card type CD (D1) is rotated relatively to the adapter (A1) in an opposite direction to the rotation direction (Y) of the business-card type CD. If so, the corners (85) of the business-card type CD (D1) are separated from between the second disk press-contact projections (7b) and the disk receiving section (2). By furthermore rotating the business-card type CD (D1) to the position shown in FIG. 7, the disk (D1) is detached from the adapter (A1).

Figure 17:
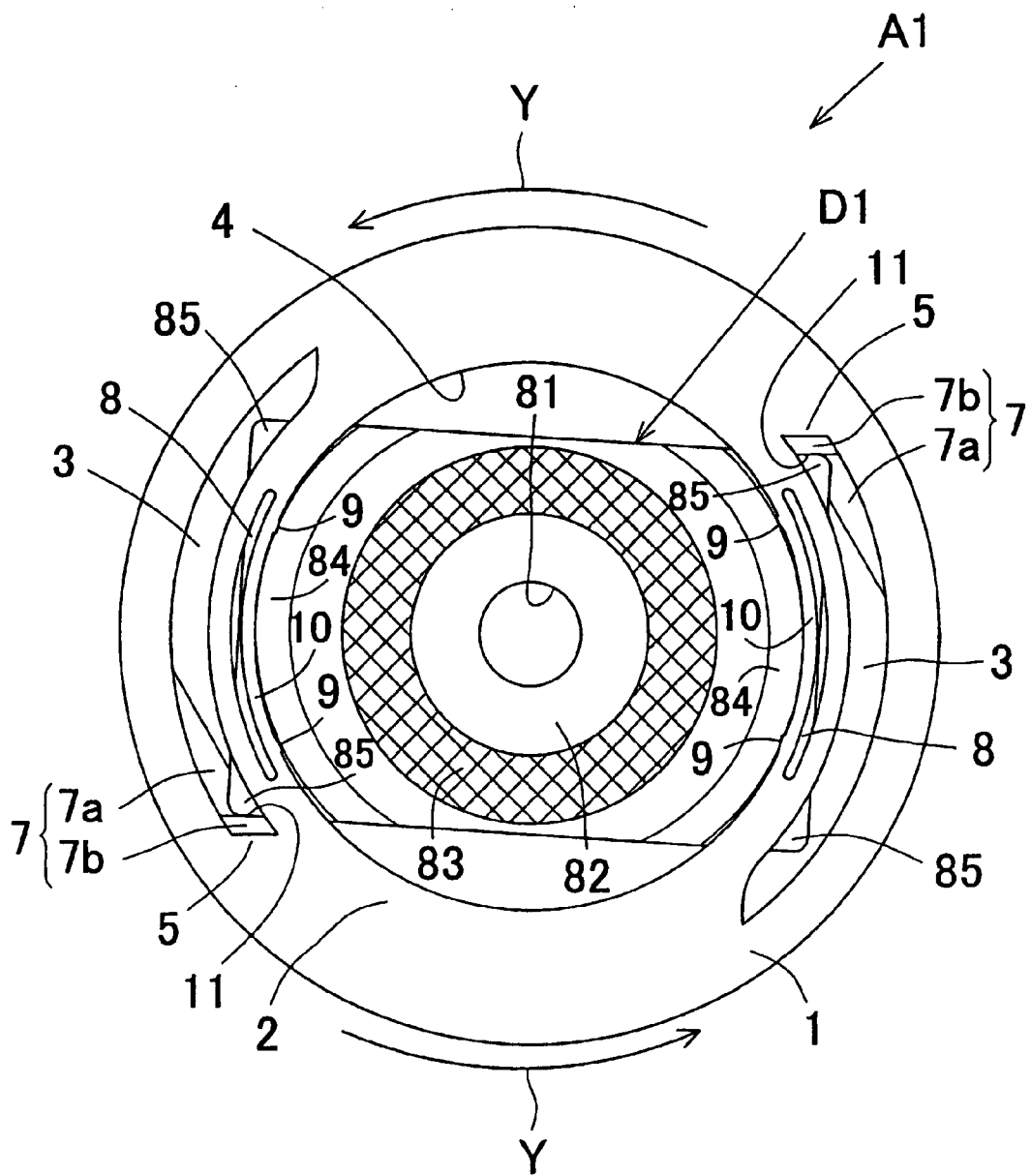
FIG. 17 is a bottom view which depicts a state in which another business-card type CD is installed in the adapter.

If a thickness of a peripheral edge of a business-card type CD (D1) is larger than that of the above-described business-card type CD (D1), this business-card type CD (D1) is installed in the adapter (A1) in a state shown in FIG. 17. Namely, since the thickness of the peripheral edge of the business-card type CD (D1) is large, the corners (85) cannot be moved to the positions below the second disk press-contact projections (7b) and are located below the first disk press-contact projections (7a) even if the business-card type CD (D1) is rotated in the predetermined rotation direction (Y). At these positions, the corners (85) of the business-card type CD (D1) are sandwiched between the first disk press-contact projections (7a) and the disk receiving section (2), respectively, thereby maintaining the installation state of the business-card type CD (D1). Thus, while the corners (85) of the business-card type CD (D1) are sandwiched therebetween, the corners (85) are abutted on stepped portions (denoted by reference symbol 11 in FIG. 6) generated between the first disk press-contact projections (7a) and the second disk press-contact projections (7b). Due to this, the corners (85) cannot be rotated any more, so that the installation operation of the business-card type CD is completed.

According to the adapter (A1) in the first embodiment, each first disk press-contact projections (7a) is formed so that the projection height is gradually increased in the rotation direction (Y) of the business-card type CD (D1) and the radial direction (R) of the annular frame (1). Therefore, even if the business-card type CD (D1) is a business-card type CD having a peripheral edge of a different thickness or a business-card type CD having a different length or width, the business-card type CD (D1) can be securely sandwiched. Besides, since the projection height of the entire projection surface of the second disk press-contact projection (7b) is set equal to that of the first disk pressing projection (7a), even the business-card type CD (D1) having a peripheral edge of a small thickness can be securely, fixedly sandwiched.

Figure 18:
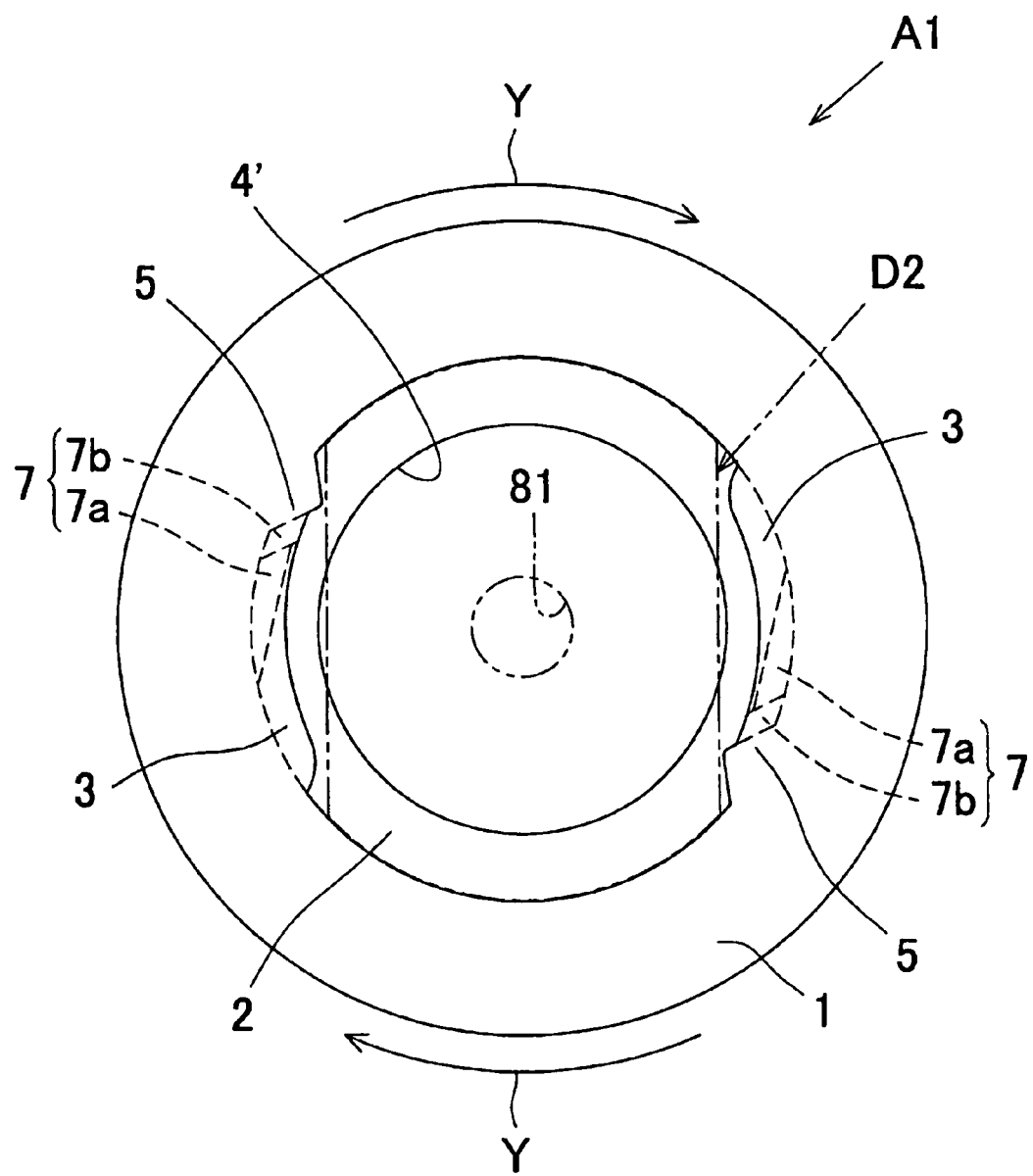
FIG. 18 is a plan view of a non-circular optical disk adapter according to a second embodiment of the present invention.
Figure 19:
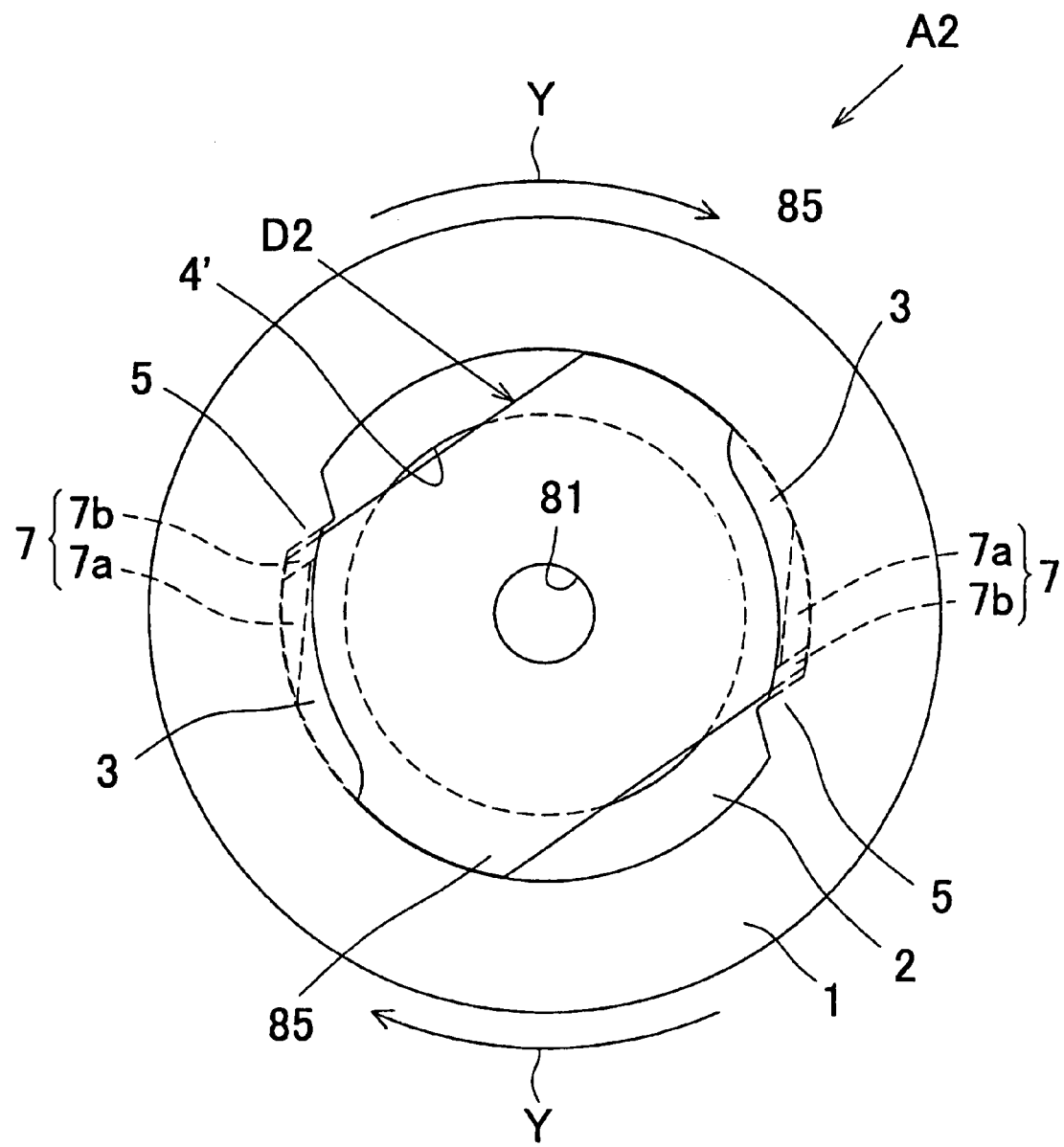
FIG. 19 is a plan view which depicts a state in which a barrel CD is installed in the adapter.

Referring to FIGS. 18 and 19, reference symbol (A2) denotes a non-circular optical disk adapter according to a second embodiment of the present invention. A barrel CD (D2) is installed, as a non-circular optical disk, into this adapter (A2). In FIGS. 18 and 19, like constituent elements of those of the adapter (A1) according to the first embodiment are denoted by the same reference symbols, respectively. Configuration of the adapter (A2) according to the second embodiment will be described mainly referring to differences in configuration from the adapter (A1) according to the first embodiment.

The barrel CD (D2) is a rectangle, has a pair of opposed circular-arc sides, and is used for reproduction only. For this barrel CD (D2), a diameter between the paired circular-arc sides is set at 8 cm. This barrel CD (D2) does not include a positioning projection but uses the paired circular-arc sides as positioning regions. A thickness of this barrel CD (D2) is set substantially equal to that of the circular CD of the standard size.

In this adapter (A2), an annular frame (1) has an outside diameter of 12 cm, which corresponds to the diameter of the circular CD of the standard size, and an inside diameter of 8 cm. A disk receiving section (2) is provided continuously and integrally on a lower portion of an inner edge of this annular frame (1) in an inward protruding manner. A circular opening (4') causing an information recording area of the barrel CD (D2) to face an optical reader (not shown) included in a disk player is provided in the central region of the disk receiving section (2), concentrically with the annular frame (1). A pair of disk pressing sections (3) and (3) are provided integrally above opposed positions on the inner edge of the annular frame (1) in an inward protruding manner. A disk press-contact projection (7) composed of a first disk press-contact projection (7a) and a second disk press-contact projection (7b) is provided on a lower surface of each disk pressing section (3). Since the first disk press-contact projection (7a) and the second disk press-contact projection (7b) are equal in configuration to those of the adapter (A1) according to the first embodiment, they will not be repeatedly described herein.

Procedures for installing the barrel CD (D2) in the adapter (A1), which are equal to those for installing the business-card type CD (D2), will be briefly described as follows.

As indicated by chain lines in FIG. 18, the barrel CD (D2) is mounted on the disk receiving section (2). In this state, the barrel CD (D2) is rotated relatively to the adapter (A2) in a rotation direction (Y) of the barrel CD by a spindle of the disk player, thereby positioning a pair of diagonal corners (85) of the barrel CD (D2) below the respective second disk press-contact projections (7b) as shown in FIG. 19. Following the rotational operation of the corners (85) of this barrel CD (D2), the disk pressing sections (3) and the disk receiving section (2) are forced outside by the corners (85), and are elastically deformed. An elastic restoring force is thereby accumulated in the disk pressing sections (3) and the disk receiving section (2). This elastic restoring force enables the corners (85) of the barrel CD (D2) to be fixedly sandwiched between the second disk press-contact projections (7b) and the disk receiving section (2), respectively, thereby maintaining an installation state of the barrel CD (D2). In this state in which the corners (85) of the barrel CD (D2) are sandwiched, the corners (85) are abutted on disk abutment portions (5), respectively. Due to this, the corners (85) cannot be rotated any more, so that the installation operation of the barrel CD is completed. In FIG. 19, for convenience of description, the corners (85) of the barrel CD (D2) are not abutted on the disk abutment sections (5) but arranged at positions slightly distant from the disk abutment sections (5).

If a thickness of a peripheral edge of the barrel CD (D2) is large, the corners (85) of this barrel CD (D2) are located below the first disk press-contact projections (7a), respectively. At these positions, the corners (85) of the barrel CD (D2) are sandwiched between the first disk press-contact projections (7a) and the disk receiving section (2), respectively, thereby maintaining the installation state of the barrel CD (D2).

Figure 20:
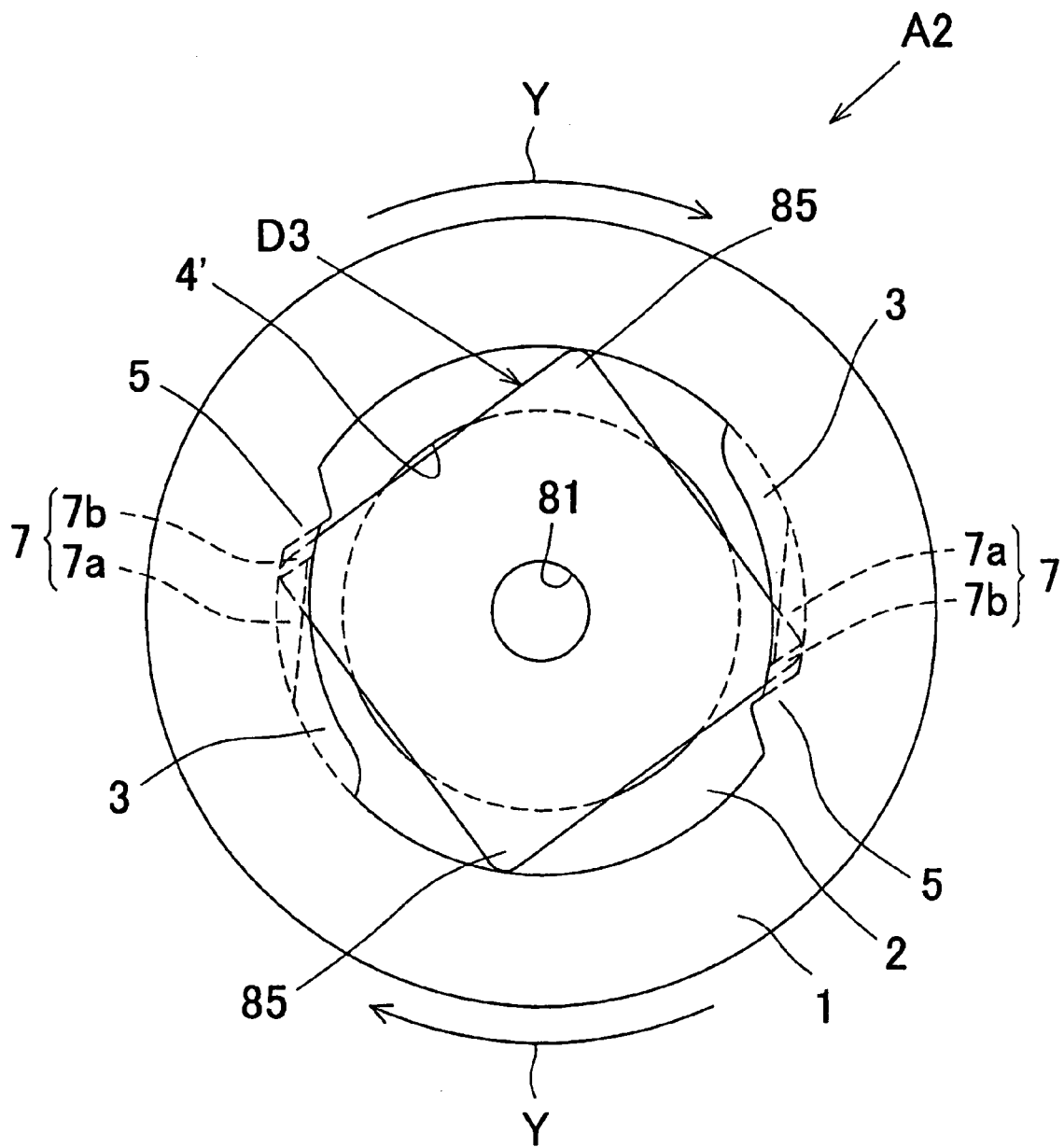
FIG. 20 is a plan view which depicts a state in which a square CD is installed in the adapter.

A square CD (D3) beside the barrel CD (D2) stated above can be installed, as the non-circular optical disk, in the adapter (A2) according to the second embodiment as shown in FIG. 20. Since procedures for installing this square CD (D3) are equal to those for installing the barrel CD (D2) stated above, repetitive procedures will not be described herein. In FIG. 20, for convenience of description, the corners (85) of the square CD (D3) are not abutted on the disk abutment sections (5) but arranged to be slightly distant from the disk abutment sections (5).

The embodiments of the present invention have been described so far. However, the present invention is not limited to the embodiments but settings can be variously changed.

For instance, according to the embodiments, the disk press-contact projection (7) is composed of the first disk press-contact projection (7a) and the second disk press-contact projection (7b). Alternatively, according to the present invention, the disk press-contact projection (7) may not include the second disk press-contact projection (7b), that is, may be composed only of the first disk press-contact projection (7a).

According to the above-stated embodiments, the disk press-contact projections (7) are provided on the lower surface of the disk pressing section (3). Alternatively, according to the present invention, the disk press-contact projections (7) may be provided on an upper surface of a region of the disk receiving section (2) opposed to the disk pressing sections (3), respectively. In this case, the corners (85) of the optical disk are sandwiched between the disk press-contact projections (7) and the disk pressing sections (3), respectively.

Furthermore, according to the above-stated embodiments, the optical disk installed in the adapter is non-writable CD, that is, a reproduction only CD (e.g., a CD-ROM or a DVD-ROM). According to the present invention, the optical disk may be a write-once CD (e.g., a CD-R, a DVD-R or a DVD+R) on which information can be written only once, a programmable CD (e.g., a CD-RW, a DVD-RW, a DVD+RW or DVD-RAM) on which information can be written repeatedly, or the like. In this case, the opening (4) functions to cause the information recording area of the disk to face the optical writer included in the disk player.

According to the above-stated embodiments, the number of pairs of disk pressing sections (3) is one but two or more pairs of disk pressing sections (3) may be used.

The adapter (A1) according to the first embodiment is intended to install the business-card type CD (D1), and the adapter (A2) according to the second embodiment is intended to install the barrel CD (D2) or the square CD (D3). Needless to say, the adapter according to the present invention may install the non-circular optical disk other than those having the above-stated shapes.

According to the first embodiment, the adapter is constituted so that the annular frame (1), the disk receiving section (2), and the disk pressing sections (3) are formed unitarily. According to the present invention, a predetermined shape may be formed by forming these constituent elements independently and then bonding them.

Advantages of the present invention will be summarized as follows.

The non-circular adapter according to the present invention has the non-circular disk mounted on the disk receiving section and rotated only in the predetermined direction, whereby the disk can be slipped into below the disk pressing sections, and the disk can be installed in the adapter with quite a simple operation.

Besides, even the disk having a peripheral portion of different thickness or the disk having a different length or width can be steadily secured by the sandwiching. Furthermore, it is possible to prevent the defect that the disk sandwiching state is released and the disk is detached within the disk player during rotation of the disk.

Furthermore, if each disk press-contact projection is formed to have a predetermined projection height, even the disk having the peripheral edge of the different thickness or the disk having the different length or width can be furthermore fixedly secured by the sandwiching.

If each disk press-contact projection includes the predetermined first disk press-contact projection and the predetermined second disk press-contact projection, even the disk having a thin peripheral edge can be steadily secured by the sandwiching.

If the adapter is provided with the predetermined disk abutment sections, a stable disk installation state can be obtained. By abutting the disk on the disk abutment sections during the disk installation operation, an installation completion sign can be obtained, making it possible to recognize that installation is completed by means other than visual recognition.

Furthermore, if the opening is formed into a circle having a diameter of 8 cm and provided concentrically with the annular frame, it is possible to ensure positioning the non-circular optical disk having the positioning projections.

Moreover, if the adapter includes the predetermined circular-arc elongated hole and the predetermined one or more pressing projections, the disk installation state can be securely maintained.

If the disk pressing projection is formed to have a predetermined projection amount, the disk can be smoothly rotated during the disk installation operation and the disk installation operation can be, therefore, easily performed.

If the disk receiving section is separated from the inner edge of the annular frame right under the disk pressing section, an adapter formation processing can be easily performed.

While the non-circular optical disk is installed, if the total weight is set to fall within the range from the weight of the circular optical disk having the diameter of 8 cm to the weight of the circular optical disk having the diameter of 12 cm, it is possible to ensure reading the information recorded on the optical disk installed in the adapter and recording the information on the optical disk.

The present application claims priority of Japanese Patent Application No. 2002-33020 filed on Feb. 8, 2002, and a disclosed content of which constitutes a part of the present application.

The terms used herein and explanations therefore are used to describe several preferred embodiments of the present invention, and are not intended to limit the present invention. Any setting changes can be allowed as long as they are within the scope of the claims and do not depart from the spirit of the invention.

It will be appreciated that the adapter according to the present invention is suited to adapt non-circular optical disks such as card type CDs (DVDs), business-card type CDs (DVDs), barrel CDs or square CDs (DVDs) to the disk loader of the disk player included in the computer or the like.

It is to be understood that the invention is not limited to the exact details of construction, operation, exact materials, or embodiments shown and described, as obvious modifications and equivalents will be apparent to one skilled in the art.

The invention claimed is:

1. A non-circular optical disk adapter made of an elastic material, comprising:
    a disk receiving section provided continuously on a lower portion of an inner edge of an annular frame having an outside diameter of 12 cm; and
    at least a pair of disk pressing sections provided continuously on an upper portion of the inner edge of the annular frame, for sandwiching a non-circular optical disk between the disk pressing sections and the disk receiving section;
    wherein the disk receiving section includes a circular opening for causing an information recording area of the disk to face an optical reader or an optical writer included in a disk player, and
    a disk press-contact projection formed so that a projection height is gradually increased in a disk rotation direction is provided on a lower surface of each of the disk pressing sections or on an upper surface of a region of the disk receiving section opposed to each of the disk pressing sections.

2. The non-circular optical disk adapter according to claim 1, wherein the disk press-contact projection is formed so that the projection height is gradually increased in the disk rotation direction and in a radial direction of the annular frame.

3. The non-circular optical disk adapter according to claim 1, wherein the disk press-contact projection includes a first disk press-contact projection formed so that the projection height is gradually increased in the disk rotation direction, and a second disk press-contact projection adjacent to a maximum protruding part of the first disk press-contact projection, and a projection height of an entire protruding surface of the second disk press-contact projection is set to be equal to or larger than a maximum projection height of the first disk press-contact projection.

4. The non-circular optical disk adapter according to claim 1, comprising a disk abutment section which prevents the disk sandwiched between the disk pressing sections and the disk receiving section from being moved in the disk rotation direction during rotation of the disk.

5. The non-circular optical disk adapter according to claim 1, wherein the opening is formed into a circle having a diameter of 8 cm, and provided concentrically with the annular frame.

6. The non-circular optical disk adapter according to claim 1, wherein circular-arc elongated holes are provided in regions of the disk receiving section opposed to the respective disk pressing sections, and one or a plurality of disk pressing projections protruding to a center of the opening are provided at positions corresponding to the respective elongated holes on an inner edge of the disk receiving section, and the one or plurality of disk pressing projections provided between positioning projections of the installed disk and the disk receiving section press the disk toward the center of the opening by an elastic restoring force of thin circular-arc sections between the pressing projections and the elongated holes.

7. The non-circular optical disk adapter according to claim 6, wherein the one or plurality of disk pressing projections are formed so that projection amounts are gradually increased in the disk rotation direction.

8. The non-circular optical disk adapter according to claim 1, wherein the disk receiving section is separated from the inner edge of the annular frame right under the disk pressing sections.

9. The non-circular optical disk adapter according to claim 1, wherein in a state in which the non-circular optical disk is installed, a total weight is set to fall within a range from a weight of the circular optical disk having a diameter of 8 cm to a weight of the circular optical disk having a diameter of 12 cm.

10. A non-circular optical disk adapter made of an elastic material, comprising:
    a disk receiving section provided continuously on a portion of an inner edge of an annular frame; and
    disk pressing sections for sandwiching a non-circular optical disk between the disk pressing sections and the disk receiving section;
    wherein the disk receiving section includes a circular opening for causing an information recording area of the disk to face an optical reader or an optical writer included in a disk player, and
    a disk press-contact projection formed so that a projection height is gradually increased in a rotation direction is provided on a surface of each of the disk pressing sections or on a surface of a region of the disk receiving section opposed to each of the disk pressing sections.

11. The non-circular optical disk adapter according to claim 10, wherein the disk press-contact projection is formed so that the projection height is gradually increased in the disk rotation direction and in a radial direction of the annular frame.

12. The non-circular optical disk adapter according to claim 10, wherein the disk press-contact projection includes a first disk press-contact projection formed so that the projection height is gradually increased in the disk rotation direction, and a second disk press-contact projection adjacent to a maximum protruding part of the first disk press-contact projection, and a projection height of an entire protruding surface of the second disk press-contact projection is set to be equal to or larger than a maximum projection height of the first disk press-contact projection.

13. The non-circular optical disk adapter according to claim 10, comprising a disk abutment section which prevents the disk sandwiched between the disk pressing sections and the disk receiving section from being moved in the disk rotation direction during rotation of the disk.

14. The non-circular optical disk adapter according to claims 10, wherein the opening is formed into a circle having a diameter of 8 cm, and provided concentrically with the annular frame.

15. The non-circular optical disk adapter according to claim 10, wherein circular-arc elongated holes are provided in regions of the disk receiving section opposed to the respective disk pressing sections, and one or a plurality of disk pressing projections protruding to a center of the opening are provided at positions corresponding to the respective elongated holes on an inner edge of the disk receiving section, and the one or plurality of disk pressing projections provided between positioning projections of the installed disk and the disk receiving section press the disk toward the center of the opening by an elastic restoring force of thin circular-arc sections between the pressing projections and the elongated holes.

16. The non-circular optical disk adapter according to claim 15, wherein the one or plurality of disk pressing projections are formed so that projection amounts are gradually increased in the disk rotation direction.

17. The non-circular optical disk adapter according to claim 10, wherein the disk receiving section is separated from the inner edge of the annular frame right under the disk pressing sections.

18. The non-circular optical disk adapter according to claim 10, wherein in a state in which the non-circular optical disk is installed, a total weight is set to fall within a range from a weight of the circular optical disk having a diameter of 8 cm to a weight of the circular optical disk having a diameter of 12 cm.

* * * * *